United States Patent
Altaf et al.

(10) Patent No.: US 12,454,196 B2
(45) Date of Patent: Oct. 28, 2025

(54) METHOD FOR IMPROVING THE AVAILABILITY OF AN ENERGY STORAGE SYSTEM IN A VEHICLE

(71) Applicant: VOLVO TRUCK CORPORATION, Gothenburg (SE)

(72) Inventors: Faisal Altaf, Västra Frölunda (SE); Bassem Farag, Gothenburg (SE); Mark Hirche, Hisings Kärra (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 255 days.

(21) Appl. No.: 18/296,063

(22) Filed: Apr. 5, 2023

(65) Prior Publication Data
US 2023/0322122 A1    Oct. 12, 2023

(30) Foreign Application Priority Data
Apr. 7, 2022    (EP) .................................... 22167162

(51) Int. Cl.
*B60L 58/12*    (2019.01)
*B60R 16/033*    (2006.01)

(52) U.S. Cl.
CPC ............ *B60L 58/12* (2019.02); *B60R 16/033* (2013.01); *B60L 2260/46* (2013.01)

(58) Field of Classification Search
CPC ..... B60L 58/12; B60L 2260/46; B60R 16/033
(Continued)

(56) References Cited
U.S. PATENT DOCUMENTS

| | | | |
|---|---|---|---|
| 8,554,468 | B1 | 10/2013 | Bullock |
| 9,043,106 | B2 | 5/2015 | Ingram et al. |

(Continued)

FOREIGN PATENT DOCUMENTS

| | | |
|---|---|---|
| DE | 102019203517 B4 | 2/2022 |
| EP | 2597539 A1 | 5/2013 |

(Continued)

OTHER PUBLICATIONS

Subhaddeep et al., "Requirements for Charging of an Electric Vehicle System based on State of Power (SoP) and State of Energy (SoE)," 2012, Publisher: IEEE.*

(Continued)

*Primary Examiner* — Tuan C To
(74) *Attorney, Agent, or Firm* — Venable LLP; Jeffri A. Kaminski

(57) ABSTRACT

The present invention relates to a method for improving the availability of an energy storage system in a vehicle. The energy storage system comprises a plurality of battery packs, and the method comprises:

acquiring battery pack performance data comprising at least one of the state-of-power, SoP, and the state-of-energy, SoE, for each one of the battery packs, wherein the acquired SoP and/or SoE for each battery pack comprises an estimated value and associated uncertainty;

processing the battery pack performance data with an estimation model adapted to relate the sum of the uncertainties to a maximum expected uncertainty of an overall SoP and/or SoE of the energy storage system; and setting the maximum allowed energy storage system charging/discharging load and/or energy storage system operational windows in response to the overall SoP and/or SoE of the energy storage system and corresponding maximum expected uncertainty.

11 Claims, 3 Drawing Sheets

(58) Field of Classification Search
USPC .......................................................... 701/22
See application file for complete search history.

(56) References Cited

U.S. PATENT DOCUMENTS

| | | | |
|---|---|---|---|
| 9,869,723 B2* | 1/2018 | Wu | .................... G01R 31/3648 |
| 10,608,444 B2* | 3/2020 | Kaneko | ................. H02J 7/0048 |
| 11,329,327 B2* | 5/2022 | Nishikawa | ................ H02J 7/02 |
| 2003/0158638 A1 | 8/2003 | Yakes et al. | |
| 2013/0261914 A1 | 10/2013 | Ingram et al. | |
| 2015/0321572 A1 | 11/2015 | Koch et al. | |
| 2015/0344036 A1 | 12/2015 | Kristinsson et al. | |
| 2015/0373583 A1 | 12/2015 | Yousefi et al. | |
| 2016/0137089 A1 | 5/2016 | Wu et al. | |
| 2016/0332616 A1 | 11/2016 | Zhao et al. | |
| 2017/0225584 A1 | 8/2017 | Jin et al. | |
| 2020/0001741 A1 | 1/2020 | Fairweather et al. | |
| 2021/0048480 A1* | 2/2021 | Lim | ..................... H01M 10/48 |
| 2021/0175572 A1* | 6/2021 | He | ...................... H01M 10/625 |
| 2021/0190867 A1* | 6/2021 | Fan | .................... G01R 31/3842 |
| 2021/0213896 A1 | 7/2021 | Cox et al. | |

FOREIGN PATENT DOCUMENTS

| | | | | |
|---|---|---|---|---|
| WO | 2021010113 A1 | 1/2021 | | |
| WO | WO-2021121673 A1 * | 6/2021 | ............ | B60L 3/0046 |
| WO | 2021254620 A1 | 12/2021 | | |

OTHER PUBLICATIONS

Non Final Office Action in corresponding U.S. Appl. No. 18/296,036, 22 pages.
European Search Report dated Oct. 10, 2022 in corresponding European Patent Application No. 22167153.0, 8 pages.
European Search Report dated Oct. 17, 2022 in corresponding European Patent Application No. 22167162.1, 8 pages.
Notice of Allowance dated May 12, 2025 in corresponding U.S. Appl. No. 18/296,036, 9 pages.

* cited by examiner

METHOD FOR IMPROVING THE AVAILABILITY OF AN ENERGY STORAGE SYSTEM IN A VEHICLE

TECHNICAL FIELD

The present invention relates to a method and system for improving the availability of an energy storage system in a vehicle. The invention furthermore relates to a vehicle, a computer program, a computer readable medium and a controlling apparatus.

The invention may be applied in any energy storage system that comprises at least two battery packs connected in parallel, wherein the parallel connection or connections may be present at any level within the energy storage system. Such energy storage system is also commonly referred to as a multi-battery system. In particular, the invention can be applied in electrically operated heavy-duty vehicles, such as trucks, buses and construction equipment. Although the invention will be described with respect to a fully electrified heavy-duty truck, the invention is not restricted to this particular vehicle, but may also be used in other vehicles such as buses, trailers, wheel loaders, excavators, passenger cars, etc. It is applicable in fully electrically operated vehicles as well as in hybrid vehicles, comprising also a combustion engine.

The invention may also be applied in electric systems of e.g. electrically propelled and operated vessels and in various working machines and passenger cars.

BACKGROUND

A vehicle typically comprises an engine for propelling the vehicle. The engine may be powered by various means, such as e.g. by liquid or gaseous fuel in an internal combustion engine, or by electric power in an electric machine. Moreover, hybrid solutions exist in which the vehicle is propelled both by an internal combustion engine and an electric machine. In either way, energy storage devices are used to store the energy needed in order to operate the engine for propelling the vehicle. For an electric machine, the energy storage devices may be batteries or supercapacitors, or, in case the vehicle is equipped with a fuel-cell system, the fuel cells being energy transformation devices, the energy storage devices are hydrogen containing storages. For cases in which the energy storage devices are batteries, the energy storage system may be referred to as a battery system.

The energy storage system of a vehicle may be used for propulsion of the vehicle as well as for providing electrical energy to various systems of a vehicle. In order to increase the power capability of the energy storage system, a solution can be provided where two or more battery packs of the energy storage system are coupled in parallel to each other. Such energy storage system may be referred to as a multi-battery system, or a multi-battery pack system. Hereby, an increased total power capability, as well as an increased in total available energy, are provided in comparison to using only a single battery pack. The multi-battery system may also be configured such that the individual battery packs can be connected to, or disconnected from, each other.

The amount of load current or power that can be continuously applied to the energy storage system during charging or discharging is determined by the state-of-power, SoP, of the energy storage system. That is, SoP may be used as a power-gauge to indicate maximum pulse charge/discharge power ability for the coming seconds or minutes, or continuously, without violating any electro-thermal limits (also ageing rate limits in some cases). Thus, in order to control which load to apply to the energy storage system, it is necessary to somehow predict the SoP of the energy storage system. The most common method in both industrial practice and academic research to predict the SoP of the energy storage system is to use a so-called bottom-up approach, in which first the SoPs of individual battery cells and battery packs within the energy storage system are estimated, and then infer the SoP of the energy storage system from these individual SoPs. A precise SoP estimation is desired for a controller to effectively regulate the charging and/or discharging current or power for optimized performance of the multi-battery system. Another similar estimate of the energy storage system which can be used instead of, or in addition to, the SoP is the state of energy, SoE. The SoE of the energy storage system represents the residual energy storage in energy storage system and may be estimated by a corresponding bottom-up approach in which first the SoEs of individual battery cells and battery packs within the energy storage system are estimated, and then infer the SoE of the energy storage system from these individual SoEs. A precise SoE estimation is desired for a controller to effectively regulate the operational window of the energy storage system for optimized performance of the multi-battery system.

One bottom-up approach for the SoP of an energy storage system is disclosed in EP 3 011 655, in which the lowest maximum power capability of one of the battery packs is multiplied by the total number of battery packs of the energy storage system in order to get the total power capability of the energy storage system. In EP 3 011 655, it is further attempted to improve the SoP of the energy storage system by using feedback about an actual maximum load on each battery pack, whenever the energy storage system is loaded at its SoP limit that was computed at a previous time step.

This control approach has the disadvantage of being quite conservative in terms of utilising the full potential service of the energy storage system, i.e. quality-of-service (QoS) (e.g. power delivery performance as per power demand while ensuring long lifetime) and state-of-utilisation (SoU) (e.g. ratio of actual power delivered and potential available power). Clearly, a too conservative estimate of the battery pack or energy storage system SoP indicates a waste of certain available power capability as well as the installed power capacity. On the other hand, a too aggressive SoP estimate of the energy storage system could incur a series of progressive issues, such as high power loss, rapid temperature increase, premature termination of charging/discharging, accelerated degradation, and even circuit faults, thermal runaway, and fire hazards. Thus, the availability of the energy storage system is dependent on the SoP estimate. A similar reasoning can be made based on the SoE of the energy storage system.

There is hence a need for improved estimations of SoP and/or SoE for energy storage systems in order to improve the availability of the energy storage system.

SUMMARY

It is an object of the present invention to at least partly alleviate the shortcomings discussed above in relation to known energy storage systems, and to improve the availability of the energy storage systems.

According to at least a first aspect of the present invention, a method for improving the availability of an energy storage system in a vehicle, the energy storage system comprising a plurality of battery packs, characterized by the steps of:

acquiring battery pack performance data comprising at least one of the state-of-power, SoP, and the state-of-energy, SoE, for each one of the battery packs in the energy storage system, wherein the acquired SoP and/or SoE for each battery pack comprises an estimated value and associated uncertainty;

processing the battery pack performance data with an estimation model adapted to relate the sum of the uncertainties to a maximum expected uncertainty of an overall SoP and/or SoE of the energy storage system; and setting the maximum allowed energy storage system charging/discharging load and/or energy storage system operational windows in response to the overall SoP and/or SoE of the energy storage system and corresponding maximum expected uncertainty.

Hereby, the availability of the energy storage system is improved as the maximum allowed energy storage system charging/discharging load and/or energy storage system operational window is not based on a single battery pack and its associated uncertainty, but the overall SoP and/or SoE of the energy storage system and corresponding maximum expected uncertainty. Thus, an individual battery pack within the energy storage system and with an associated uncertainty for the SoP and/or SoE which otherwise would have limited the maximum allowed energy storage system charging/discharging load and/or energy storage system operational window if considered alone, is instead used in an agglomeration of the values and associated uncertainty of the SoP and/or SoE for all battery packs in the energy storage system resulting into the maximum expected uncertainty for the overall SoP and/or SoE of the energy storage system (or multi-battery system). Thus, the individual battery pack may thus not affect the availability of the energy storage system in the same way as if considered alone. Furthermore, a proactive management of connection/disconnection of individual battery packs within the energy storage system may be performed by rationalization based on their individual SoPs and/or SoE, and associated uncertainties. For example, a specific battery pack with a too low SoP and/or too low SoE, or with a too high corresponding uncertainty, may be disconnected from the energy storage system. Hereby, sudden reduction or loss of energy storage system availability can be reduced, e.g. in case that a specific battery pack is deemed inoperable due to due to a too high uncertainty in SoP and/or SoE or a too low value of SoP and/or SoE.

It should be understood that processing the battery pack performance data with an estimation model adapted to relate the sum of the uncertainties to a maximum expected uncertainty of an overall SoP and/or SoE of the energy storage system, means that the SoP and/or SoE for each battery pack (and their respective associated uncertainties) is used together to determine the maximum expected uncertainty of the overall SoP and/or SoE of the energy storage system. The maximum expected uncertainty of the overall SoP and/or SoE of the energy storage system may be referred to as the maximum expected uncertainty of the total SoP and/or SoE of the energy storage system, wherein the overall, or total, SoP and/or SoE refers to that of the energy storage system, and not individual battery packs. Thus, the estimation model relates the sum of the uncertainties to the maximum expected uncertainty of the overall, or total, SoP and/or SoE of the energy storage system.

According to at least one example embodiment, the uncertainty of the overall, or total, SoP and/or SoE of the energy storage system is provided with an interval, i.e., minimum to maximum power or energy capability of the energy storage system.

The step of acquiring battery pack performance data comprising at least one of the state-of-power, SoP, and the state-of-energy, SoE is generally known.

As used in the context of the present application, SoP of an energy storage system is defined by the maximum constant current magnitude or power magnitude with which the energy storage system can be continuously charged or discharged during a following time period, i.e., the prediction time horizon, without violating any battery cell-level operating constraints. Such operating constraints may e.g. be related to the voltage, temperature, absolute maximum current limit, usage history, ageing rate etcetera. The SoP of the energy storage system during charging is defined by the maximum constant current magnitude or power magnitude with which the energy storage system can be continuously charged during the prediction time horizon, without violating any battery cell level operating constraints. Correspondingly, the SoP of the energy storage system during discharging is defined by the maximum constant current magnitude or power magnitude with which the energy storage system can be continuously discharged during the prediction time horizon, without violating any battery cell-level operating constraints. The SoP of the energy storage system may be determined in terms of one or both of current magnitude and power magnitude. The SoP of the energy storage system may be determined in parallel for a charging and a discharging scenario and may in this case comprise a current and/or a power value valid for charging, and a current and/or a power value valid for discharging. The SoP of the energy storage system may also be predicted for only one of a charging and a discharging scenario.

The SoP of the energy storage system may e.g. be determined using a single battery model for each battery pack "i", as described in patent application PCT/EP2020/066919, together with the associated uncertainty as described for the present invention. In such method, the SoP for each battery pack i may be related to the open circuit voltage $V_{OCi}$, (or $OCV_i$) the internal resistance $R_{0i}$, a minimum voltage limit $V_i^{min}$ and a maximum voltage limit $V_i^{max}$ in accordance with the following:

$$SoP_{i,charge}(t) = I_{i,charge}^{max}(t) * V_i^{max} = \frac{(V_i^{max} - V_{OCi})}{R_{0i,charge}} * V_i^{max} \qquad \text{Eq. 1}$$

$$SoP_{i,discharge}(t) = I_{i,discharge}^{max}(t) * V_i^{min} = \frac{(V_i^{min} - V_{OCi})}{R_{0i,discharge}} * V_i^{min} \qquad \text{Eq. 2}$$

Thus, the maximum current may be different depending on whether electric current is charged to or discharged from the battery pack. As such, a battery pack may be associated with two state-of-power values: a charge state-of-power value SoP, and a discharge state-of-power value SoP. Moreover, the open circuit voltage $V_{OCi}$ can be modelled so as to be dependent on the State of Charge, $SoC_i$ of the battery pack (which may be a time dependent parameter). The uncertainty for the SoP for each battery pack may be applied to one or more of the input parameters in equations 1 and 2 above.

It should be noted that the uncertainties for the SoP and/or SoE may dependent on errors or uncertainties in various input parameters to the SoP and SoE, such as e.g. in the current measurement, voltage measurement, temperature measurement, SoC measurement/estimation, OCV characteristics, battery pack impedance parameters (internal resistances, capacitances etc). The uncertainties in the input parameters are propagated through the SoP calculations for each battery pack to estimate the uncertainty in output value of SoP for each battery pack. As described above, the SoP and its uncertainty for each battery pack is then used to estimate the maximum expected uncertainty of an overall SoP and/or SoE of the energy storage system.

It should be noted that other ways of determining the SoP for each battery pack are feasible. For example, as described in patent application PCT/EP2020/066874, a supplier of battery pack may provide information indicative of the battery pack SoP, or be determined by individual battery management units. As another non-limiting example, the SoP of the battery pack may be determined before adding the battery pack to its associated energy storage system, for instance using a test procedure or the like. Alternatively, the SoP for each battery pack may be determined using a central system, such as a central battery management system (BMS).

The SoE (or State-of-Stored-Energy, SoSE) is generally defined by the ratio of remaining stored energy ($E_S$) to the total energy capacity ($E_{S,Full}$) at a fully charged state of the battery pack at any given time:

$$SoE(t) = \frac{E_S(t)}{E_{S,Full}} \qquad \text{Eq. 3}$$

SoE is typically not measured directly, but it is estimated with some uncertainty by current, voltage, temperature measurements, SoC, OCV, and Q (capacity) or SoQ (state-of-capacity) estimates using known approximations, for example:

$$\hat{E}_S(t) \approx (\widehat{SoC}(t) - SoC_{winLow}) \cdot \hat{Q} \cdot \hat{V}_{oc,nom} \qquad \text{Eq. 4}$$

$$\hat{E}_S(t) = \int_{SoC_{winlow}}^{SoC(t)} \hat{Q} \cdot V_{oc}(\xi) \cdot d\xi \qquad \text{Eq. 5}$$

where SoC(t) is the State of Charge at present time instant 't', $SoC_{winLow}$ is the lower limit of (configured) SoC window, $V_{OC}$ is the Open Circuit Voltage (OCV) curve of the battery pack, $V_{OC,nom}$ is the nominal OCV value, and Q the Coulombic Capacity Estimate.

The first approximation according to equation 4 is simpler but less accurate than the second approximation according to equation 5. Also note that other estimations of SoE may be used within the concept of the invention, for example SoE also including losses under load profile. Thus, SoP and SoE are predictions or estimations based on internal states and/or health parameter(s) of the corresponding battery pack using e.g. measured or otherwise determined voltage levels, current levels and temperature levels, known to the skilled person. Thus, expressed in a more general terms, the estimated values of SoP and/or SoE are typically the result of measurement data used as input to the corresponding SoP and/or SoE model. The measurement data may e.g. be current, voltage and temperature data acquired from corresponding current, voltage and temperature sensors. The associated uncertainty of the SoP and/or SoE may thus be the result of measurement uncertainties, e.g. measurement uncertainties of sensors (e.g. the current and voltage sensors). The associated uncertainty of the SoP and/or SoE is typically the result of uncertainties in the corresponding SoP and/or SoE model as the various uncertainties (as measurement uncertainties) of the input parameters of the SoP and/or SoE model is propagated through SoP and SoE calculations for each battery pack to estimate the associated uncertainty in output value of SoP and SoE for each battery pack.

According to at least one example embodiment, and stated more generally, the SoP and/or SoE for each one of the battery packs may be predicted by using at least one of the following battery pack internal states: state-of-charge (SoC), dynamic polarization, state-of-health (SoH), and state-of-temperature (SoT), together with at least one of the following battery pack health parameter: state-of-resistance (SoR), State-of-Capacity (SoQ). The SoR and SoQ may e.g. be determined by voltage, current, and temperature measurement of the battery pack using different types of linear/nonlinear estimation methods including Kalman Filtering, Recursive Least Squares, etcetera. Stated differently, SoP and SoE, both depends on current, voltage, temperature, SoC, and typically at least one of the battery pack health parameters. Thus, the energy storage system may comprise a plurality of sensors configured to measure at least one quantity and to provide sensory measurement data of voltage, current and/or temperature.

Stated differently, and according to at least one example embodiment, characteristics of each battery pack is indicative by sensory measurement data, wherein the SoP and/or SoE are determined based on the sensory measurement data.

According to at least one example embodiment, the step of processing the battery pack performance data with an estimation model adapted to relate the sum of the uncertainties to a maximum expected uncertainty of an overall SoP and/or SoE of the energy storage system may be performed by regression, is analytically based on a mathematical model, or by using monte-carlo simulations. Thus, the estimation model may be a regression model, a dynamic mathematical model based on another model such as an electrochemical model, an empirical model, a semi-empirical model, or another known model, or be based on simulations. The step of acquiring the overall SoP and/or SoE of the energy storage system in response of the SoP and/or SoE of each one of the battery packs is generally known. The overall SoP and/or SoE of the energy storage system is e.g. the sum of the corresponding SoP and SoE of each one of the battery packs, taking into account for non-uniformity between the battery packs. For example, the non-uniformity between the battery packs (e.g. imbalance between battery pack SoP or SoE), may be accounted for by the following equation relating the overall SoP of the energy storage system ($SoP_{ESS}$) for the SoP of each one of the battery packs ($SoP_i$):

$$SoP_{ESS} = \min(SoP_i) * n * \alpha \qquad \text{eq. 6}$$

where n is the number of battery packs in the energy storage system and a denotes the derating parameter for tuning depending on level of non-uniformity between the battery packs.

In summary, the associated uncertainty of the SoP and/or SoE for each one of the battery pack propagates through the estimation model to provide the output of the maximum expected uncertainty for the SoP and/or SoE of the energy storage system ($SoP_{ESS}$, $SoE_{ESS}$)

The energy storage system may be referred to as a multi-battery system comprising a plurality of individual, or single, battery packs. The individual battery packs are typically connected in parallel in the multi-battery system. The term "multi-battery system" may thus be used interchangeably with the term "energy storage system", "ESS", or "electric energy storage system" throughout the application text. Thus, the overall SoP and/or SoE of the energy storage system may be referred to as a multi-battery system SoP and/or SoE, and the SoP and/or SoE of each one of the battery packs may be referred to as individual battery pack SoP and/or SoE. The uncertainties related to the SoP and/or SoE may e.g. be based on confidence interval of a probability distribution function, e.g. a Gaussian distribution, or be simply given in terms of tolerance range or confidence interval around a respective mean value (most likely value). These tolerance range or confidence intervals can be computed by analyzing statistical properties of input parameter errors (for example gaussian or non-gaussian characteristics of errors in current, voltages, temperatures, and other battery pack parameters as described above). All of the battery packs of the energy storage system are typically used when processing the battery pack performance data to achieve the maximum expected uncertainty of the overall SoP and/or SoE of the energy storage system.

Stated differently, for the SoP, the estimated value and associated uncertainty may be described as that the value of the SoP is augmented with an uncertainty (or inaccuracy or confidence interval). Correspondingly, for the SoE, the estimated value and associated uncertainty may be described as that the value of the SoE is augmented with an uncertainty (or inaccuracy or confidence interval). Thus, the SoP and/or SoE may be calculated and provided by e.g. the battery management system at each time instant for each battery pack. This augmented state information is then used to determine the maximum expected uncertainty of the overall SoP and/or SoE of the energy storage system.

According to at least one example embodiment, the estimated value and associated uncertainty for the acquired SoP and/or SoE for each battery pack is an output from a statistical model of the corresponding battery pack. The statistical model can be identified offline by studying characteristics of various errors and uncertainties as described above.

The output of the statistical model may e.g. give the estimated value together with a confidence interval to define the degree of uncertainty in a sample statistic.

According to at least one example embodiment, the estimation model is a statistical model, or a machine learning model formed from the battery pack performance data of the battery packs and the energy storage system from the vehicle or from a plurality of vehicles.

Hereby, a simple yet effective means for providing the maximum expected uncertainty of the overall SoP and/or SoE of the energy storage system is provided.

For example, the estimation model may be devised by applying equation 6 described above at the boundaries (i.e., at the limits):

$$SoP_{ESS}^{max}=(SoP_i+\sigma_{p,i})*n*\alpha \quad \text{Eq. 7}$$

$$SoP_{ESS}^{min}=(SoP_i-\sigma_{p,i})*n*\alpha \quad \text{Eq. 8}$$

$$\sigma_{P,ESS}=SoP_{ESS}^{max}-SoP_{ESS}^{min} \quad \text{Eq. 9}$$

Where $SoP_{ESS}^{max}$ is the maximum achievable SoP for the energy storage system, ESS, $SoP_{ESS}^{max}$ is the minimum achievable SoP for the ESS, $\sigma_{p,ESS}$ is the tolerance range or level of uncertainty in SoP for the ESS and $\sigma_{p,i}$ the same for each battery pack "i". These can be computed/estimated separately for charging and discharging process. As an alternative, nonlinear programming problem may be set up by including uncertainty information as constraints. Such problem is typically not solvable analytically, but can be solved by employing nonlinear optimization as known to the skilled person. Corresponding estimation model may be derived for the SoE as well.

According to at least one example embodiment, the maximum allowed energy storage system charging/discharging load and/or energy storage system operational windows is limited by the maximum available power that can be drawn from the energy storage system during a predetermined upcoming time interval.

Thus, the maximum expected uncertainty of the overall SoP and/or SoE limits the maximum available power that can be drawn from the energy storage system during the predetermined upcoming time interval. The time interval may e.g. be 1 second up to 10 minutes.

According to at least one example embodiment, the determined maximum allowed energy storage system charging/discharging load and/or energy storage system operational windows is used as input data to electronic propulsion system controllers of the vehicle.

According to at least one example embodiment, setting the maximum allowed energy storage system charging/discharging load and energy storage system operational windows in response to the maximum expected uncertainty is performed to minimize a sudden at least temporary lack of operability of the energy storage system.

For example, the sudden at least temporary lack of operability of the energy storage system is the result of a reduction or loss of power. Thus, by using the maximum expected uncertainty of the overall SoP and/or SoE instead of the independent SoP and SoE of each battery pack, sudden at least temporary lack of operability of the energy storage system can be reduced. That is, instead of using the nominal values of the SoP and/or SoE, proactive power management can be performed based on available uncertainty information to reduce likelihood of sudden denial of power, which may lead to a hazardous situation. For example, based on uncertainty information, vehicle control unit may either plan overtaking maneuver (for example during autonomous driving mode) considering availability of power and uncertainty, or it may inform driver in advance during manual driving mode.

According to at least one example embodiment, the method comprises:

identifying a vehicle situation which, in case of an at least temporary lack of operability of the energy storage system, belong to a predetermined group of vehicle situations defined as hazardous, wherein setting the maximum allowed energy storage system charging/discharging load and/or the energy storage system operational windows in response to the maximum expected uncertainty is performed during such identified vehicle situation.

The predetermined group of vehicle situations defined as hazardous may comprise, or may be defined by, ISO 26262 (titled "Road vehicles—Functional safety"). For example, the predetermined group of vehicle situations defined as hazardous may be determined by the Hazard Analysis and Risk Assessment, HARA, according to ISO 26262. Typically, the HARA includes the ASIL Assessment Process, and the Severity classifications (S0-S3). Moreover, the HARA may include the Exposure Classifications (E0-E4) and/or Controllability classifications (C0-C3). For example, the vehicle situation may be considered hazardous by the Severity classification of at least S1, or at least S2 (or S3).

Thus, the availability of the energy storage system may be improved when there is a high risk associated with an at least temporary lack of operability of the energy storage system. A vehicle situation which is identified to belong to the predetermined group of vehicle situations defined as hazardous may be referred to as a potentially harmful situation.

The potentially harmful situation may thus be defined in accordance with ISO 26262 (titled "Road vehicles—Functional safety"). In other words, the potentially harmful situation may be based on HARA and the ASIL Assessment Process, and the Severity classifications (S0-S3). Moreover, the risk level of the hazardous vehicle situation or potentially harmful situation may be based on the Exposure Classifications (E0-E4) and/or Controllability classifications (C0-C3). For example, the potentially harmful situation is considered hazardous by the Severity classification of at least S1, or at least S2 (or S3). Thus, the risk associated with an at least temporary lack of operability of the energy storage system may be determined in response to vehicle safety.

According to at least one example embodiment, the predetermined group of vehicle situations defined as hazardous comprises vehicle situations potentially resulting in personal injuries.

For example, the potentially harmful situation previously mentioned may be defined as resulting in personal injuries, or potentially resulting in personal injuries. According to at least one example embodiment, the predetermined group of vehicle situations defined as hazardous comprises vehicle situations resulting in personal injuries.

According to a second aspect of the invention, a battery management system for an energy storage system in a vehicle, the energy storage system comprising a plurality of battery packs, is provided. The battery management system is characterised by:
- a data acquisition unit configured to acquire battery pack performance data comprising at least one of the state-of-power, SoP, and the state-of-energy, SoE, for each one of the battery packs in the energy storage system, wherein the acquired SoP and/or SoE for each battery pack comprises an estimated value and associated uncertainty; and
- a control unit configured to process the battery pack performance data with an estimation model adapted to relate the sum of the uncertainties to a maximum expected uncertainty of an overall SoP and/or SoE of the energy storage system; and configured to set the maximum allowed energy storage system charging/discharging load and/or energy storage system operational windows in response to the overall SoP and/or SoE of the energy storage system and corresponding maximum expected uncertainty.

Effects and features of the second aspect of the invention are largely analogous to those described above in connection with the first aspect of the invention. Embodiments mentioned in relation to the first aspect of the invention are largely compatible with the second aspect of the invention, of which some are exemplified below.

According to a third aspect of the invention, a vehicle comprising a system according to the second aspect of the invention.

According to a fourth aspect of the invention, a computer program comprising program code means for performing the steps the first aspect of the invention, when said program is run on a computer, is provided.

Such computer program may e.g. be implemented in an electronic control unit, ECU, of the vehicle.

According to a fifth aspect of the invention, a computer readable medium carrying a computer program comprising program code means for performing the steps of the first aspect of the invention, when said computer program is run on a computer, is provided.

According to a sixth aspect of the invention, a controlling apparatus for improving the availability of an energy storage system in a vehicle, the controlling apparatus being configured to perform the steps of the method according to the first aspect of the invention, is provided.

Effects and features of the third to sixth aspects of the invention are largely analogous to those described above in connection with the first aspect of the invention. Embodiments mentioned in relation to the first aspect of the invention are largely compatible with the third to sixth aspects of the invention.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
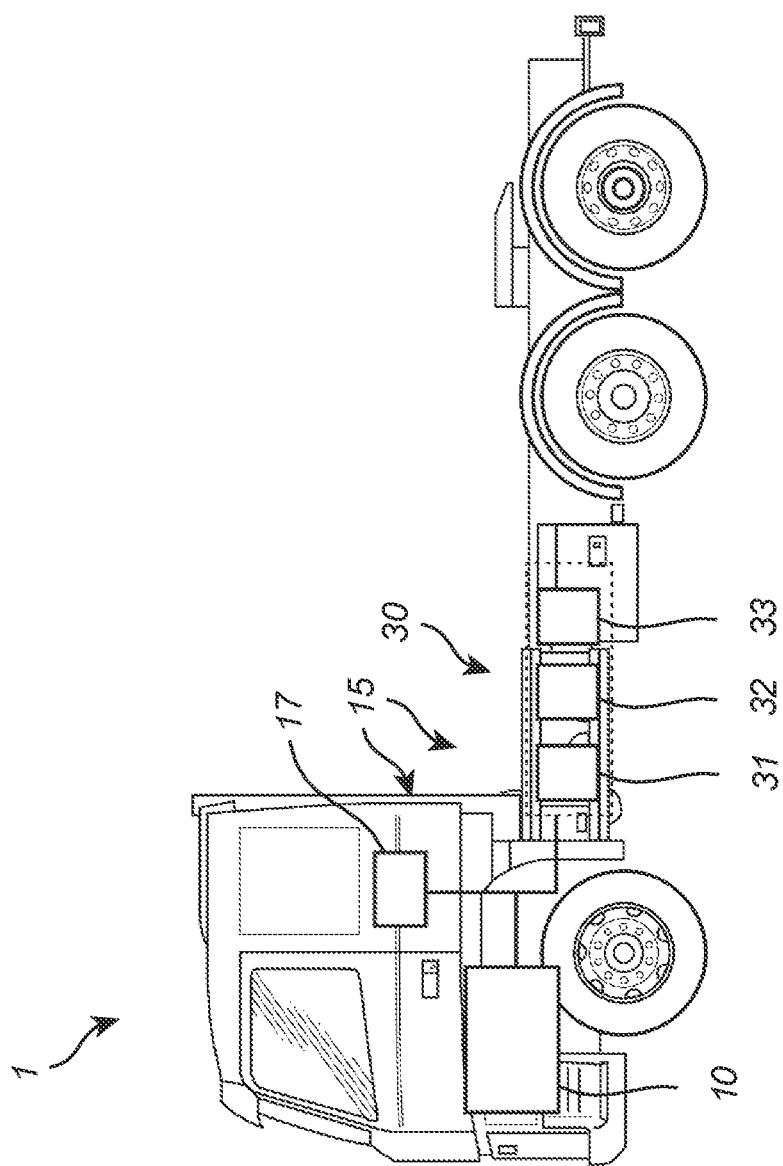
FIG. 1 is a side schematic view of a vehicle in accordance with an example embodiment of the invention.

With reference to FIG. 1, a vehicle 1, here embodied as a heavy-duty truck 1, is disclosed for which a method and system of a kind disclosed in the present invention is advantageous. However, the method and system may as well be implemented in other types of vehicles or vessels, such as in light-weight trucks, buses and construction equipment as well as passenger cars, marine applications etc. The vehicle 1 is an electric vehicle, such as a full electric vehicle or a hybrid, comprising at least one electric machine 10 powered by the energy storage system 30 controlled by a battery management system 15. In the example of FIG. 1, the energy storage system 30 comprises three energy storage devices 31, 32, 33, here being parallel connected battery packs 31, 32, 33. The battery management system 15 is configured to manage the energy storage system 30 and e.g. connected and disconnect the battery packs 31, 32, 33 relative the electric machine 10 and any other energy consumers of the vehicle. Moreover, the battery management system 15 comprises a controlling apparatus 17 arranged and configured for controlling the operation of the energy storage system 30. The vehicle 1 typically further comprises other parts of the powertrain such as transmission, drive shafts and wheels (not shown in detail).

Figure 2:
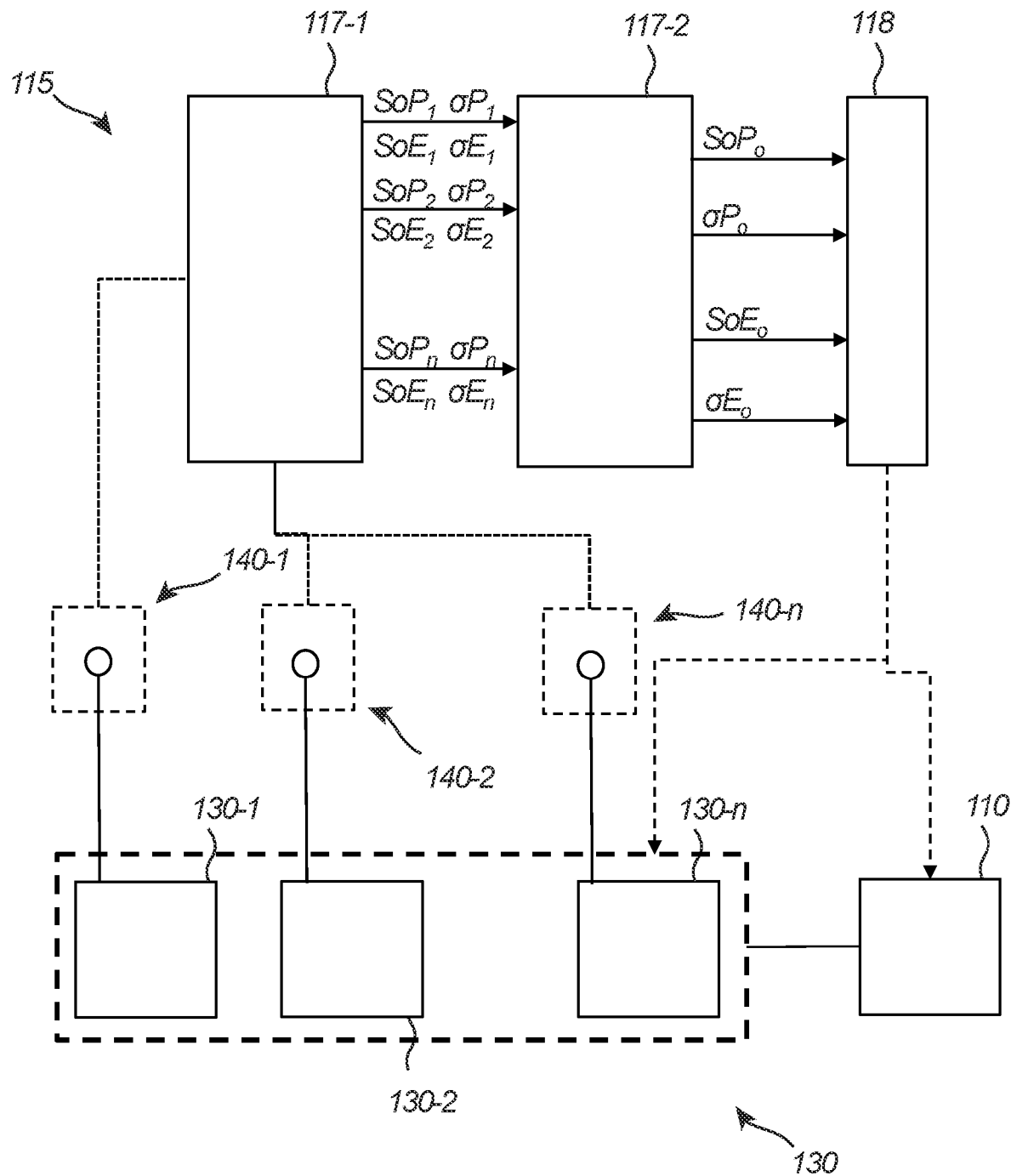
FIG. 2 is a schematic view of an energy storage system and a battery management system in accordance with an example embodiment of the invention.

FIG. 2 is a schematic view of an energy storage system 130 comprising a plurality of battery packs 130-1, 130-2, 130-n where n is any integer higher than 2, and a battery management system 115. The battery packs 130-1, 130-2, 130-n are typically forming the parts of the energy storage system, as e.g. series or parallel connected battery packs 130-1, 130-2, 130-n arranged for powering a load 110. Each battery pack 130-1, 130-2, 130-n typically comprises a plurality of series connected battery cells. The load 110 may be connected and disconnected to the first, second and nth battery packs 130-1, 130-2, 130-n via at least one contactor (not shown). The embodiment shown in FIG. 2 may for example be implemented in the vehicle 1 of FIG. 1. Thus, the load 110 in FIG. 2 may be an electric machine, such as a traction electric machine. Alternatively, the load 110 may comprise auxiliary loads.

The battery management system 115 comprises a data acquisition unit 117-1 configured to acquire battery pack performance data comprising at least one of the state-of-power, SoP, and the state-of-energy, SoE, for each one of the battery packs 130-1, 130-2, 130-n. As shown in FIG. 2, each battery pack 130-1, 130-2, 130-n is associated with a corresponding sensor 140-1, 140-2, 140-n configured to measure at least one quantity of the corresponding battery pack 130-1, 130-2, 130-n, such as e.g. temperature, current and/or voltage (for simplicity, only one sensor per battery pack is shown in FIG. 2). Thus, an associated sensor, here being a first, second and n:th sensors 140-1, 140-2, 140-n, exist for each battery pack, here being the corresponding first, second and n:th battery packs 130-1, 130-2, 130-n. In other words, each one of the first, second and n:th sensors 140-1, 140-2, 140-n is configured to provide condition data comprising at least a condition parameter, here in the form of measured data or a measured parameter (i.e. of the at least one quantity) for the first, second and n:th battery packs 130-1, 130-2, 130-n, respectively. Thus, at least partly in response to the measured parameter provided by the sensors 140-1, 140-2, 140-n, the data acquisition unit 117-1 is configured to provide the SoP and/or SoE for each battery pack 130-1, 130-2, 130-n. For example, data acquisition unit 117-1 may be provided with a SoP model and/or SoE model, wherein the SoP and/or SoE for each battery pack 130-1, 130-2, 130-n is determined using such SoP model and/or SoE model. The SoP model and/or SoE model is configured to, for each battery pack 130-1, 130-2, 130-n, provide an estimated value of the SoP, here referred to as SoP1, SoP2, SoPn, and an estimated value of the SoE, here referred to as SoE1, SoE2, SoEn, and associated uncertainty $\sigma P1$, $\sigma P2$, $\sigma Pn$, $\sigma E1$, $\sigma E2$, $\sigma En$. The associated uncertainty $\sigma P1$-$\sigma Pn$ for the SoP, and/or the associated uncertainty $\sigma E1$-$\sigma En$ for the SoE, for each battery pack 130-1, 130-2, 130-n is e.g. the result of measurement uncertainties of the sensors 140-1, 140-2, 140-n, and/or model uncertainties the SoP model and/or the SoE model, as previously described.

The SoP model and/or the SoE model are typically mathematical models. For example, the SoP for each one of the battery packs 130-1, 130-2, 130-n is based on the open circuit voltage $OCV_i$, the internal resistance $R_{0i}$, a minimum voltage limit $V_{i,min}$ and a maximum voltage limit $V_{i,max}$, as described with reference to equations 1 and 2 presented earlier. For example, the SoE for each one of the battery packs 130-1, 130-2, 130-n is based on the ratio of remaining stored energy ($E_S$) to the total energy capacity ($E_{S,Full}$) at a fully charged state of the battery pack, as described with reference to equation 3 presented earlier, together with the energy estimations given in equation 4 or 5.

The battery management system 115 further comprises a control unit 117-2 configured to process the battery pack performance data from the data acquisition unit 117-1, with an estimation model. The estimation model is adapted to relate the sum of the uncertainties $\sigma P1$-$\sigma Pn$; $\sigma E1$-$\sigma En$ to a maximum expected uncertainty $\sigma Po$, $\sigma Eo$ of an overall SoPo and/or SoEo of the energy storage system 130. That is, the estimation model is adapted to relate the sum of the uncertainties for the SoP, $\sigma P1$-$\sigma Pn$ to a maximum SoPo uncertainty $\sigma Po$, and to relate the sum of uncertainties for the SoE, $\sigma E1$-$\sigma En$ to a maximum SoEo expected uncertainty $\sigma Eo$. The overall SoPo may alternatively be abbreviated $SoP_{ESS}$ and the overall SoEo as $SoE_{ESS}$. Typically, the control unit 117-2 is furthermore configured to determine the overall SoPo and/or SoEo of the energy storage system 130 using the SoP and/or SoE of the plurality of battery packs 130-1, 130-2, 130-n, as previously described (e.g. in PCT/EP2020/066919 or PCT/EP2020/06687), while also including the uncertainties as previously described. Thus, the associated uncertainty $\sigma P1$, $\sigma P2$, $\sigma Pn$, $\sigma E1$, $\sigma E2$, $\sigma En$ of the SoP and/or SoE for each one of the battery packs 130-1, 130-2, 130-n propagates through the estimation model to provide the output of the maximum expected SoPo uncertainty $\sigma Po$ and/or the maximum expected SoEo uncertainty $\sigma Eo$.

The battery management system 115 may further comprise vehicle electronic propulsion system controllers 118 configured to control charging/discharging load of the energy storage system 130, and/or the allowed operational window of the energy storage system 130. The vehicle electronic propulsion system controllers 118 may be configured to receive the maximum expected SoPo uncertainty $\sigma Po$ and/or the maximum expected SoEo uncertainty $\sigma Eo$ from the control unit 117-2 to set the maximum allowed energy storage system 130 charging/discharging load and/or energy storage system operational windows. Thus, in response to the overall SoPo and/or SoEo of the energy storage system 130 and corresponding maximum expected uncertainty $\sigma Po$, $\sigma Eo$, the vehicle electronic propulsion system controllers 118 may set the operational limits of the energy storage system 130.

It should be noted that the data acquisition unit 117-1, the control unit 117-2, and potentially the vehicle electronic propulsion system controllers 118 may be incorporated into a single controlling apparatus, as controlling apparatus 17 of FIG. 1. The controlling apparatus may include a microprocessor, microcontroller, programmable digital signal processor or another programmable device. The controlling apparatus may also, or instead, include an application specific integrated circuit, a programmable gate array or programmable array logic, a programmable logic device, or a digital signal processor. Where the controlling apparatus includes a programmable device such as the microprocessor, microcontroller or programmable digital signal processor mentioned above, the processor may further include computer executable code that controls operation of the programmable device.

A method for improving the availability of an energy storage system in a vehicle, such as e.g. the energy storage system 130 of FIGS. 1-2 will now be described in more general terms. The energy storage system comprising a plurality of battery packs, such as e.g. the battery packs 130-1, 130-2, 130-n of FIG. 2.

In a first step S10, battery pack performance data comprising at least one of the state-of-power, SoP, and the state-of-energy, SoE, for each one of the battery packs in the energy storage system is acquired. The acquired SoP and/or SoE for each battery pack comprises an estimated value, as SoP1-SoPn; SoE1-SoEn described with reference to FIG. 2, and associated uncertainty, as $\sigma P1$-$\sigma Pn$; $\sigma E1$-$\sigma En$ described with reference to FIG. 2. For example, the data acquisition unit 117-1 of FIG. 2 may be used for such purpose. The estimated values of the SoP and/or SoE, and associated uncertainty for the acquired SoP and/or SoE for each battery pack may be an output from a statistical model of the corresponding battery pack, as previously described.

In a second step S20, the battery pack performance data is processed with an estimation model adapted to relate the sum of the uncertainties $\sigma P1$-$\sigma Pn$; $\sigma E1$-$\sigma En$ to a maximum expected uncertainty $\sigma Po$, $\sigma Eo$ of an overall SoPo and/or SoEo of the energy storage system. For example, the control unit 117-2 of FIG. 2 may be used for such purpose. The estimation model may e.g. be a statistical model, or a machine learning model formed from the battery pack performance data of the battery packs and the energy storage system from the vehicle or from a plurality of vehicles, as previously described.

In a third step S30, the maximum allowed energy storage system charging/discharging load and/or energy storage system operational windows is set in response to the overall SoPo and/or SoEo of the energy storage system and corresponding maximum expected uncertainty σPo, σEo. For example, the maximum allowed energy storage system charging/discharging load and/or energy storage system operational windows may be limited by the maximum available power that can be drawn from the energy storage system during a predetermined upcoming time interval. As described with reference to FIG. 2, the determined maximum allowed energy storage system charging/discharging load and/or energy storage system operational windows may be used as input data to electronic propulsion system controllers 118 of the vehicle.

According to at least one example embodiment, setting the maximum allowed energy storage system charging/discharging load and energy storage system operational windows in response to the maximum expected uncertainty is performed to minimize a sudden at least temporary lack of operability of the energy storage system. For such purpose, the method may comprise the step S25 of identifying a vehicle situation which, in case of an at least temporary lack of operability of the energy storage system belong to a predetermined group of vehicle situations defined as hazardous, as previously described (a vehicle situation which results in a potentially harmful situation). The step S25 is typically performed prior to the third step S30, wherein the maximum allowed energy storage system charging/discharging load and energy storage system operational windows is set in response to the maximum expected uncertainty during such identified vehicle situation.

Figure 3:
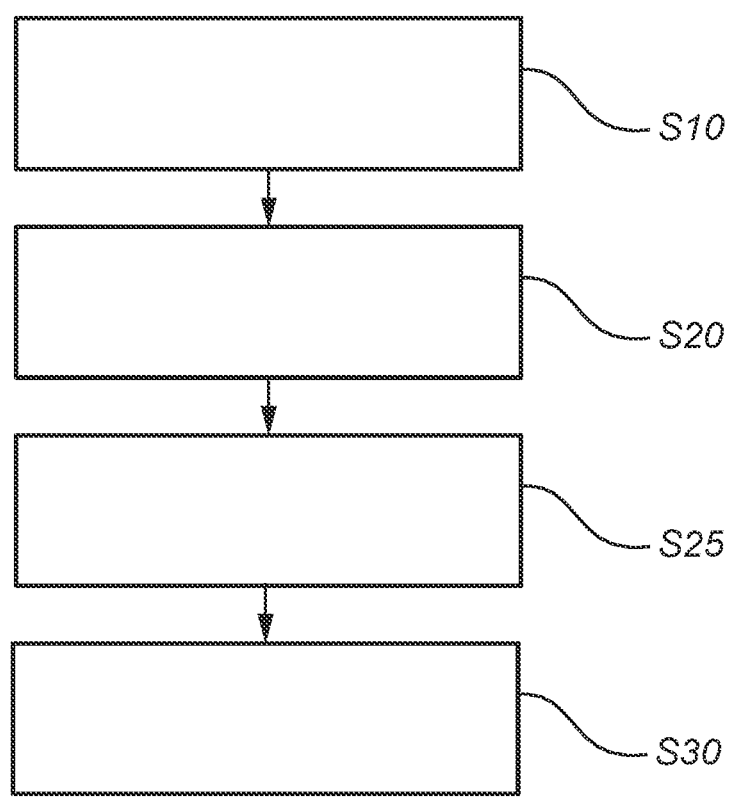
FIG. 3 is a flowchart illustrating the steps of a method in accordance with example embodiments of the invention.

According to at least one example embodiment, the battery management system 115 of FIG. 2 is configured to perform the method as described with reference to FIG. 3, for example using the data acquisition unit 117-1 and the control unit 117-2. The method as described with reference to FIG. 3 may be implemented in a computer program. Thus, the computer program may comprise program code means for performing the method as described with reference to FIG. 3, when the program is run on a computer. Alternatively the method as described with reference to FIG. 3 may be implemented in a computer readable medium carrying a computer program comprising program code means for performing the method as described with reference to FIG. 3, when the computer program is run on a computer.

It should be noted that the naming of the steps not necessarily, but might according to at least one example embodiment, relate to the order in which the steps are carried out. Thus, the order of the steps may be different than that explained here, and the controlling apparatus 17 of FIG. 1 (or data acquisition unit 117-1 and control unit 117-2 of FIG. 2) may be configured to carry out one or several of the steps. Moreover, one or more of the steps may be combined and carried out simultaneously.

It should be understood that the uncertainties of the SoP and/or SoE, i.e. uncertainties σP1-σPn; σE1-σEn described with reference to FIG. 2, typically are the result from an agglomeration of uncertainties or errors from various sources, e.g. measurement uncertainties and uncertainties stemming from the SoP model and/or SoE model as described earlier. The uncertainties or errors may further more originate from the determination of internal states and/or health parameter(s) of the corresponding battery pack. For example, the uncertainties or errors originate from the determination of the voltage output, current output, temperature, rest time, battery cell capacity, coulomb efficiency, self-discharge, parasitic draw, and battery cell balancing current of the corresponding battery pack. The sources of the uncertainties or errors of SoP and/or SoE may generally be divided into specific error types, which correspond with specific phenomena, and sensor error sources. Examples of such specific error types are open circuit voltage (OCV) correction error which generally is characterized by randomly distributed error based on magnitudes of various SoC error sources. Examples of sensor error sources are temperature sensor error, battery cell voltage sensor error, and current sensor error. Another type of uncertainties or errors which may be taken into consideration is time-dependent errors, for example time-dependent SoC error dependent on current sensor offset and battery cell self-discharge. Time dependent uncertainties or errors may be enhanced over time. Typically, the sources of the uncertainties or errors used for the uncertainties of the SoP and/or SoE are weighted in relation to their applicability and relevance for the specific energy storage system and SoP model and/or SoE model used.

It is to be understood that the present invention is not limited to the embodiments described above and illustrated in the drawings; rather, the skilled person will recognize that many changes and modifications may be made within the scope of the appended claims.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any standard (such as ISO 26262) mentioned in the present application are to be based on instructions valid on the date of priority of the present application.

The invention claimed is:

1. A method for improving the availability of an energy storage system in a vehicle, the energy storage system comprising a plurality of battery packs, characterized by the steps of:

acquiring battery pack performance data comprising at least one of the state-of-power, SoP, and the state-of-energy, SoE, for each one of the battery packs in the energy storage system, wherein the acquired SoP and/or SoE for each battery pack comprises an estimated value and associated uncertainty;

processing the battery pack performance data with an estimation model adapted to relate a sum of the uncertainties to a maximum expected uncertainty of an overall SoP and/or SoE of the energy storage system; and setting a maximum allowed energy storage system charging/discharging load and/or energy storage system operational windows in response to the overall SoP and/or SoE of the energy storage system and corresponding maximum expected uncertainty.

2. The method according to claim 1, wherein the estimated value and associated uncertainty for the acquired SoP and/or SoE for each battery pack is an output from a statistical model of the corresponding battery pack.

3. The method according to claim 1, wherein the estimation model is a statistical model, or a machine learning model formed from the battery pack performance data of the battery packs and the energy storage system from the vehicle or from a plurality of vehicles.

4. The method according to claim 1, wherein the maximum allowed energy storage system charging/discharging load and/or energy storage system operational windows is limited by the maximum available power that can be drawn from the energy storage system during a predetermined upcoming time interval.

5. The method according to claim 1, wherein the determined maximum allowed energy storage system charging/discharging load and/or energy storage system operational windows is used as input data to electronic propulsion system controllers of the vehicle.

6. The method according to claim 1, wherein setting the maximum allowed energy storage system charging/discharging load and energy storage system operational windows in response to the maximum expected uncertainty is performed to minimize a sudden at least temporary lack of operability of the energy storage system.

7. The method according to claim 6, comprising:
identifying a vehicle situation which, in case an at least temporary lack of operability of the energy storage system belong to a predetermined group of vehicle situations defined as hazardous, wherein setting the maximum allowed energy storage system charging/discharging load and energy storage system operational windows in response to the maximum expected uncertainty is performed during such identified vehicle situation.

8. A non-transitory computer readable medium carrying a computer program comprising program code for performing the steps of claim 1 when said computer program is run on a computer.

9. A controlling apparatus for improving the availability of an energy storage system in a vehicle, the controlling apparatus being configured to perform the steps of the method according to claim 1.

10. A battery management system for an energy storage system in a vehicle, the energy storage system comprising a plurality of battery packs, characterised by:
a hardware-based data acquisition unit comprising one or more sensors and processors configured to acquire battery pack performance data comprising at least one of the state-of-power, SoP, and the state-of-energy, SoE, for each one of the battery packs in the energy storage system, wherein the acquired SoP and/or SoE for each battery pack comprises an estimated value and associated uncertainty; and
a control unit implemented as dedicated electronic circuitry or a microcontroller configured to process the battery pack performance data with an estimation model adapted to relate a sum of the uncertainties to a maximum expected uncertainty of an overall SoP and/or SoE of the energy storage system; and configured to set a maximum allowed energy storage system charging/discharging load and/or energy storage system operational windows in response to the overall SoP and/or SoE of the energy storage system and corresponding maximum expected uncertainty.

11. A vehicle comprising the battery management system according to claim 10.

* * * * *